United States Patent
Xiao et al.

(10) Patent No.: US 7,873,215 B2
(45) Date of Patent: Jan. 18, 2011

(54) PRECISE IDENTIFICATION OF TEXT PIXELS FROM SCANNED DOCUMENT IMAGES

(75) Inventors: Jing Xiao, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 874 days.

(21) Appl. No.: 11/769,467

(22) Filed: Jun. 27, 2007

(65) Prior Publication Data

US 2009/0003700 A1    Jan. 1, 2009

(51) Int. Cl.
     *G06K 9/34*      (2006.01)
(52) U.S. Cl. ...................................... 382/173
(58) Field of Classification Search ........................ None
See application file for complete search history.

(56) References Cited

U.S. PATENT DOCUMENTS

| | | | |
|---|---|---|---|
| 5,265,173 A | | 11/1993 | Griffin et al. |
| 5,390,259 A | * | 2/1995 | Withgott et al. ............. 382/173 |
| 5,555,556 A | * | 9/1996 | Ozaki ......................... 382/173 |
| 5,563,957 A | * | 10/1996 | Ueno et al. .................. 382/173 |
| 5,579,414 A | | 11/1996 | Fast et al. |
| 5,594,815 A | | 1/1997 | Fast et al. |
| 5,594,817 A | | 1/1997 | Fast et al. |
| 5,625,719 A | | 4/1997 | Fast et al. |
| 5,729,635 A | | 3/1998 | Fast et al. |
| 5,778,103 A | | 7/1998 | Allan et al. |
| 5,787,194 A | * | 7/1998 | Yair ........................... 382/173 |
| 5,956,468 A | * | 9/1999 | Ancin ......................... 358/1.9 |
| 6,097,849 A | | 8/2000 | Nevis |
| 6,141,444 A | | 10/2000 | Hasegawa |
| 6,226,402 B1 | | 5/2001 | Katsuyama |
| 6,227,725 B1 | | 5/2001 | Ancin et al. |
| 6,275,304 B1 | | 8/2001 | Eschbach et al. |
| 6,516,091 B1 | * | 2/2003 | Nagarajan et al. ............ 382/173 |
| 6,621,595 B1 | | 9/2003 | Fan et al. |
| 6,701,010 B1 | | 3/2004 | Katsuyama |
| 6,701,015 B2 | | 3/2004 | Fujimoto et al. |
| 6,754,385 B2 | | 6/2004 | Katsuyama |
| 6,757,081 B1 | * | 6/2004 | Fan et al. .................... 358/474 |
| 6,785,420 B2 | | 8/2004 | Yamaai |
| 6,973,213 B2 | * | 12/2005 | Fan et al. .................... 382/176 |
| 6,993,185 B2 | * | 1/2006 | Guo et al. .................... 382/176 |
| 7,570,816 B2 | * | 8/2009 | Bargeron et al. ............. 382/224 |
| 7,693,329 B2 | * | 4/2010 | Chelvayohan et al. ....... 382/173 |

(Continued)

OTHER PUBLICATIONS

Pegasus Imaging Corporation, FormFix v2 Form Processing Toolkit, Product Description, Retrieved from the Internet: <URL:http://www.pegasusimaging.com/formfix.htm> Feb. 21, 2006.

(Continued)

*Primary Examiner*—Yuzhen Ge

(57) ABSTRACT

A system or method for identifying text in a document. A group of connected components is created. A plurality of characteristics of different types is calculated for each connected component. Statistics are computed which describe the group of characteristics. Outlier components are identified as connected components whose computed characteristics are outside a statistical range. The outlier components are removed from the group of connected components. Text pixels are identified by segmenting pixels in the group of connected components into a group of text pixels and a group of background pixels.

18 Claims, 15 Drawing Sheets

U.S. PATENT DOCUMENTS

| | | | |
|---|---|---|---|
| 2002/0131644 A1* | 9/2002 | Takebe | 382/228 |
| 2003/0113016 A1* | 6/2003 | Naoi et al. | 382/181 |
| 2004/0017579 A1 | 1/2004 | Lim | |
| 2004/0027618 A1 | 2/2004 | Nakamura et al. | |
| 2004/0042680 A1 | 3/2004 | Saund | |
| 2004/0066538 A1* | 4/2004 | Rozzi | 358/2.1 |
| 2004/0174546 A1 | 9/2004 | Guleryuz | |
| 2004/0175037 A1 | 9/2004 | Guleryuz | |
| 2005/0289182 A1 | 12/2005 | Pandian et al. | |

OTHER PUBLICATIONS

Pegasus Imaging Corporation, FormFix (.NET) Retrieved from the Internet: <URL:ftp://www.pegasusimaging.com/formsuite/FormSuiteDotNet.zip>; WinForms ScanFix5; Classes; (LineRemovalOptions Class and LineRemovalResults Class). Manual, May 11, 2007.

* cited by examiner

幼児旅行代金について

- 幼児旅行代金の適用範囲：旅行出発日を基準として2歳未満のお子様はマケタさま(おひとり様)までです。(但し、幼児が航空座席を使用される場合は、こども料金となります。)
- 幼児旅行代金 (おひとり分/単位：円)

| 出発地 | 東　京 | | 大　阪 | |
|---|---|---|---|---|
| 出発日 | 1/6～3/15<br>3/21～3/31 | 3/16～3/20 | 1/6～8, 2/3,4,<br>9～11,17,18,24,25<br>3/2,3,9,10,16～24 | 1/9～31, 2/1,2,5～8,<br>12,16,19,20,26～28<br>3/1,4～8,11～15,25～31 |
| ツアー | 12,000 | 14,000 | 14,000 | 13,000 |

| 出発地 | 東 京 | 大 阪 | グアム |
|---|---|---|---|
| 出発日 | 1/6～3/15<br>3/21～3/31 | 3/16～3/20 | 1/6～8、2/3･4、<br>8～11、17、18、24･25、<br>3/2･3･9･10、16～24 | 1/9～31、2/1･2、<br>5～16、19～23、26～28、<br>3/1～8、11～15、26～31 |
| グアム | 12,000 | 14,000 | 14,000 | 13,000 |

| 出発地 | 東 京 | | 大 阪 | |
|---|---|---|---|---|
| 出発日 | 1/8〜3/15 | 3/16〜3/20 | 1/6〜8, 2/3・4, 9〜11, 17・18, 24・25 3/2・3・9・10, 16〜24 | 1/9〜31, 2/1・2, 5〜8, 12〜16, 19〜28 3/1・4〜8, 11〜15, 25〜31 |
| グアム | 12,000 | 14,000 | 14,000 | 13,000 |

| 出発地 | 東　京 | | 大　阪 | |
|---|---|---|---|---|
| 出発日 | 1/6~3/15 | 3/16~3/20 | 1/6~8、2/3・4、<br>9~11・17・18・24・25<br>3/2・3・9・10・16~24 | 1/9~31、2/1、2/5~8、<br>12~16、19~23、26~29<br>3/1・4~8、11~15、25~31 |
| グアム | 12,000 | 14,000 | 14,000 | 13,000 |

PRECISE IDENTIFICATION OF TEXT PIXELS FROM SCANNED DOCUMENT IMAGES

CROSS-REFERENCE TO RELATED APPLICATIONS

U.S. patent application Ser. No. 11/202,720, filed on Aug. 12, 2005 is hereby incorporated by reference in its entirety.

BACKGROUND OF THE INVENTION

1. Field of the Invention

The present invention relates to systems and methods for Scanning Documents.

2. Description of the Related Art

Performing Optical Character Recognition (OCR) on scanned document images is important for many tasks, such as digital library construction and high-quality document display. Because a document often consists of both images and text, OCR requires extracting the text from the mixed document before the recognition process can begin. The prior art decomposes the document into areas of text and images, the layout, and then performs pattern recognition in the individual areas. These prior art layout extraction methods typically assume that the background of the document that was scanned is clean and homogeneous in color. Thus, the structural information of the text and image areas can be directly computed. However, a scanned document image does not necessarily have a clean background. For example, a magazine page with a colorful background and a pattern. Even if the background appears homogeneous, it may include halftone textures that are an artifact of the printing method. Therefore, it may be difficult to extract text layouts from document images of these types. It is the goal of the present invention to address these issues with the prior art.

SUMMARY OF THE INVENTION

The present invention is a system or method for identifying text in a document. A group of connected components is created. A plurality of characteristics of different types is calculated for each connected component. Statistics are computed which describe the group of characteristics. Outlier components are identified as connected components whose computed characteristics are outside a statistical range. The outlier components are removed from the group of connected components. Text pixels are identified by segmenting pixels in the group of connected components into a group of text pixels and a group of background pixels.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1A illustrates is an exemplary image on which the present invention may be practiced;

FIG. 1C illustrates a first binary image based on the LACE labeled image;

FIG. 1D illustrates a second binary image based on the first binary image;

FIG. 1E illustrates a third binary image based on the second binary image;

FIGS. 7A-C illustrate a second example image upon which the present invention may be practiced and the results of the present invention, once it has acted upon the second example image;

FIGS. 8A-B illustrate a third example image upon which the present invention may be practiced and the result of the present invention once it has acted upon the third example image.

DESCRIPTION OF THE PREFERRED EMBODIMENTS

In this report we present a method to resolve the difficulty of character extraction using the LACE (label aided copy enhancement) method as described in U.S. patent application Ser. No. 11/202,720, herein incorporated by reference.

The LACE method provides a pixel-labeling scheme with high position accuracy. It uses image gradients to classify image pixels with one of five LACE labels: a halftone label; a strong edge in a halftone region label; a strong edge in non-halftone region label; a non-halftone label; and a background label.

However, when OCR is performed directly on LACE labeled pixels it is not very accurate. For example, for characters that are printed in a large font, the pixel labels on the boundary of the character and the body of the character are often different. Inconsistencies such as this often result in poor OCR performance on documents that include characters printed with large fonts.

In addition, pixels which have been labeled as strong halftone edges such as pixels that form table lines and image boundaries also lead to poor OCR performance on texts embraced by such lines. To address these problems and others, we present a method that eliminates the strong lines from the LACE labels and then uses the image features together with the refined labels to extract both the boundaries and bodies of the texts consistently, even in a colored background with strong halftone textures.

Problem Statement

Figure 1B:
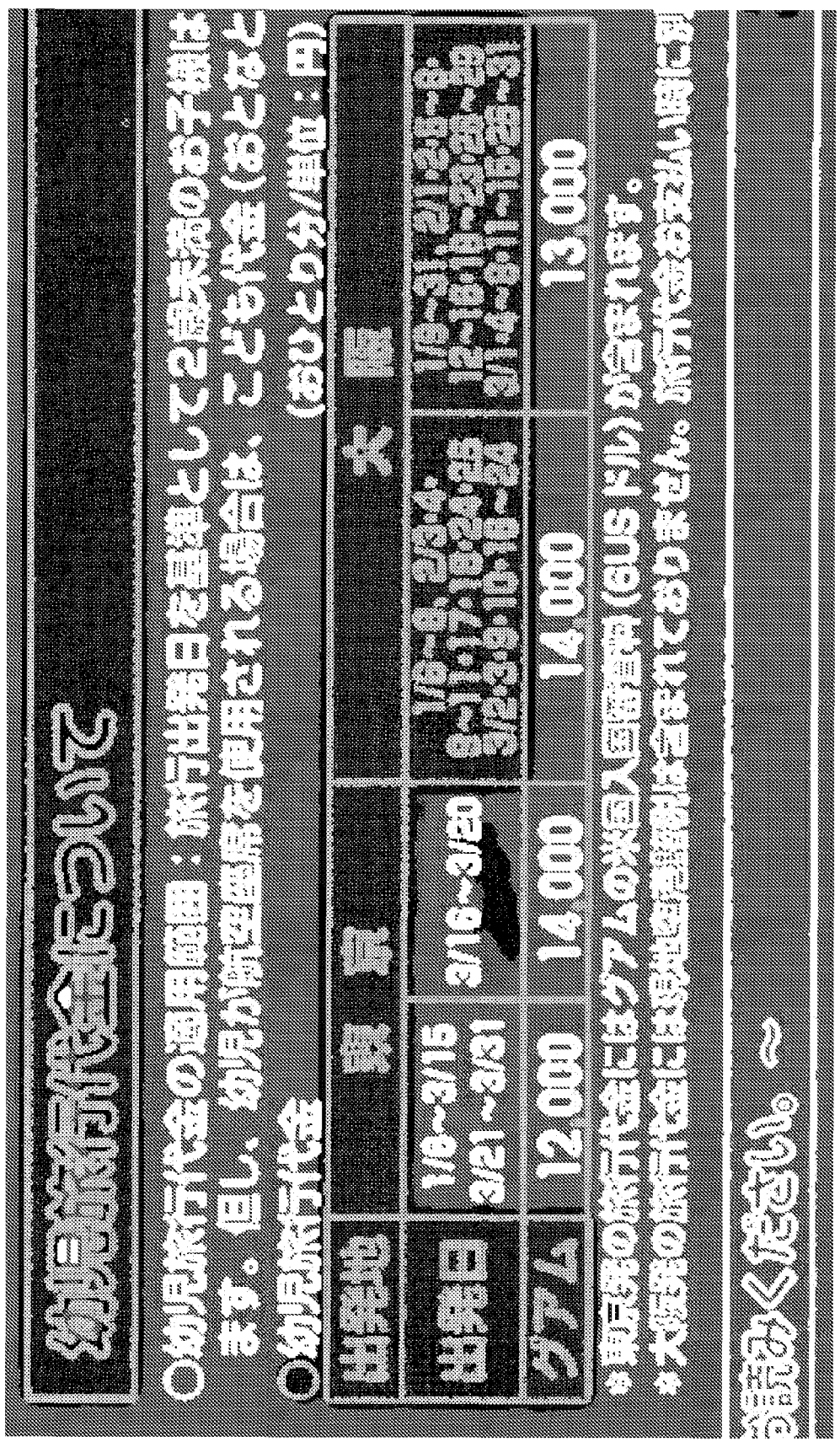
FIG. 1B illustrates a LACE labeled image which may be a first intermediary result of the present invention.

Given a scanned document image 102, as shown in FIG. 1A, the LACE labels of the pixels can be computed. The method, or an equivalent, described in U.S. patent application Ser. No. 11/202,720 may be used to compute the LACE labels. FIG. 1B is an illustration of a LACE labeled image 104. Based on the LACE labels, a first binary image 106, as shown in FIG. 1C may be constructed where the non-halftones and halftone edges are represented as white pixels and the other pixels are represented by black pixels. Alternative labeling methodologies that allow foreground pixels to be distinguished from background pixels may be used in place of the LACE labels without going beyond the scope of the present invention as recited in the claims.

Goals of the present invention include addressing two problems with LACE labeled images. A first goal is to remove strong and long lines including table lines and image boundaries, as shown in a second binary image 108 as illustrated in FIG. 1D. It then identifies the character pixels consistently on both the boundaries and the bodies, as shown in a third digital image 110 illustrated in FIG. 1E.

Removing the Lines

Figure 1F:
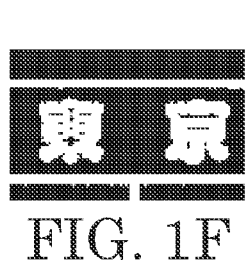
FIG. 1F illustrates a cropped portion of the first binary image.
Figure 1G:
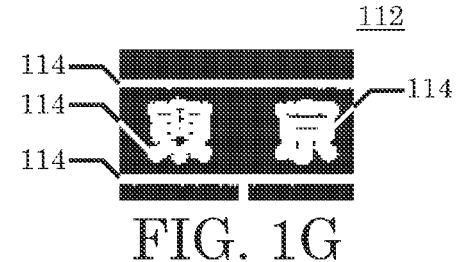
FIG. 1G illustrates the cropped portion of the binary image with connected components in the image identified.

To remove the strong and long lines in the first binary image 106, connected components of the white label pixels are computed. FIG. 1F shows, for illustration purposes, a cropped portion 112 of the first binary image 106. FIG. 1G shows the cropped portion 112 with four connected components 114 identified. Please note that two of the connected components identified in FIG. 1G extend beyond the boundaries of the cropped portion 202. This has been cropped for illustration purposes only and is not meant to limit the scope of the claims.

Figure 2:
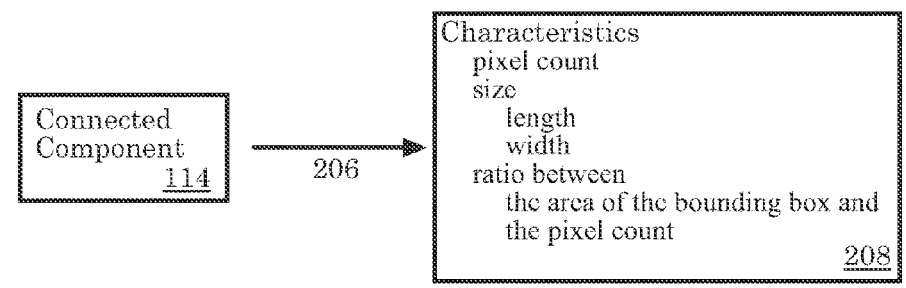
FIG. 2 is an illustration between the relationship between characteristics and connected components.

As shown in FIG. 2, characteristics 208 for each connected component 114 are calculated in a step 206. Examples of such characteristics 208 are: pixel count; size (including length and width); and ratio between the area of the bounding box and the pixel count. An individual skilled in the art would understand that there are other examples of characteristics 208, which would effectively describe the connected component.

Figure 3:
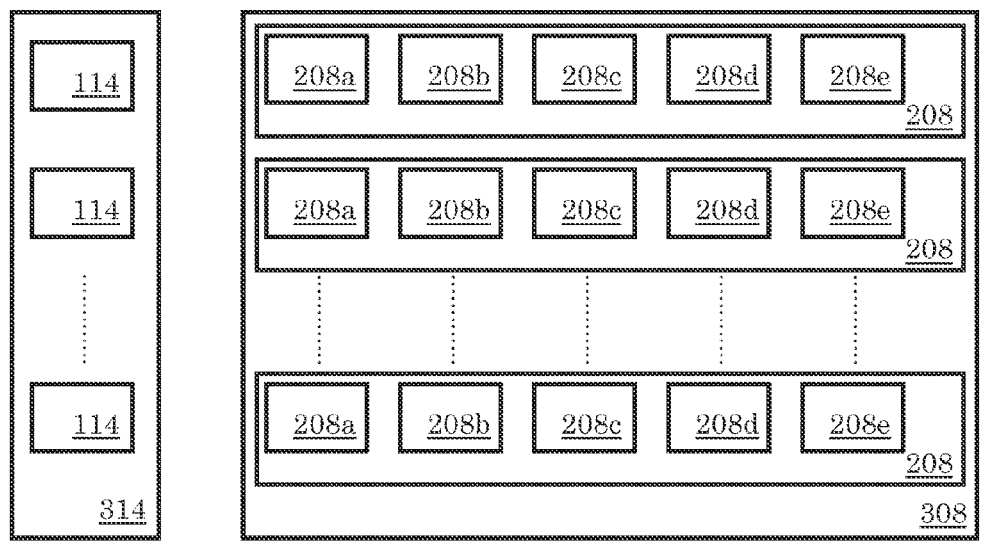
FIG. 3 is an illustration of an array of characteristics and an array of connected components.

A connected components list 314 may be an array that identifies each connected component 114 found in the first binary image 106 as shown in FIG. 3. A characteristics array 308 may be a list of characteristics 208 associated with each connected component 114. Wherein each component has 1, 2, 3, 4, 5, or more characteristics associated with each component. For example, element 208a may be the pixel count; element 208b may be the length; element 208c may be the width; element 208d may be the ratio between the area of the bounding box and the pixel count; and element 208e may be the aspect ratio.

Figure 4:
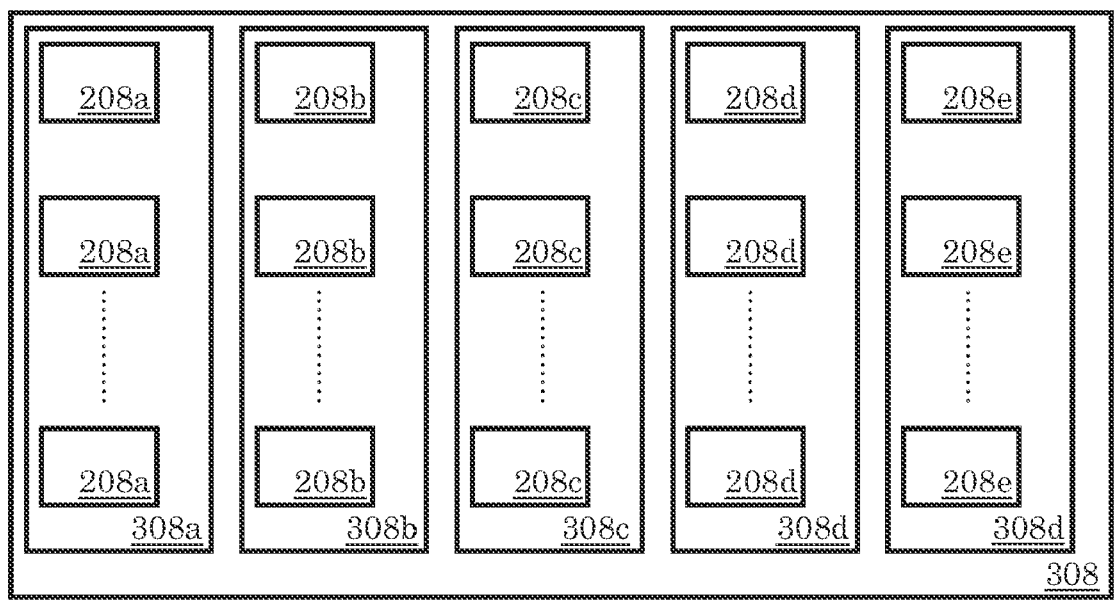
FIG. 4 is an additional illustration of the array of characteristics.
Figure 5:
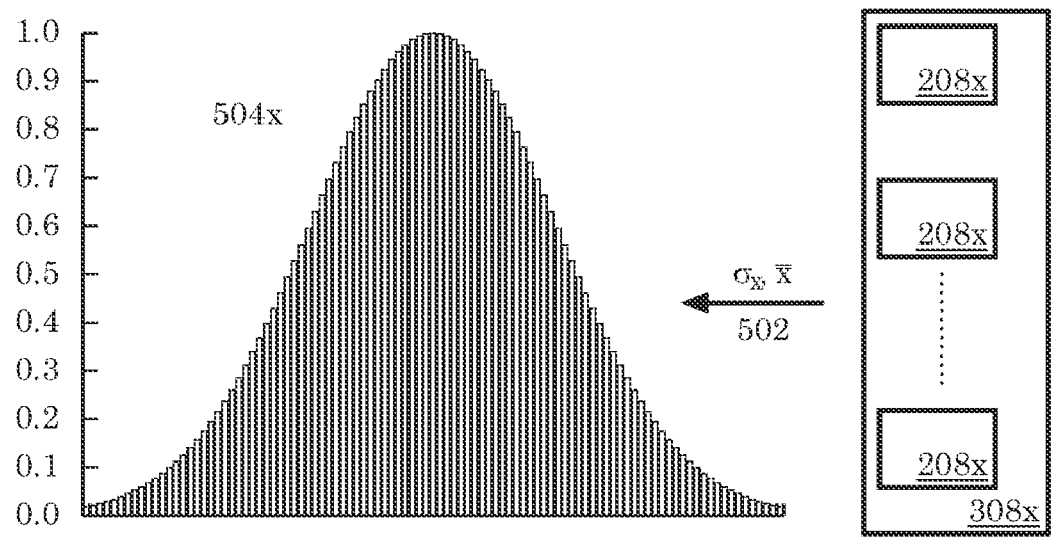
FIG. 5 is an illustration of a list of a particular characteristic and a statistical description of that list.

FIG. 4 is an alternative representation of the characteristics array 308. In this representation of array 308, like characteristics are grouped together into arrays. For example, array 308a may be an array of pixel counts, wherein each element in the array 308a is the pixel count of a connected component found in the connected components list 314. Arrays 308b, 308c, 308d, and 308e are also associated with the connected components list 314 in the same manner.

The arrays 308a-e are considered to be lists of a particular characteristic. A list 308x of a particular characteristic may be a generalized form of the arrays 308a-e. Each list 308x of a particular characteristic is used to compute, in a step 502, an estimated statistical distribution 504x that describes the list 308x. The distribution 504x may be described by the mean and the standard deviation of the list 308x. In a preferred embodiment of the invention, Gaussian statistics are assumed, although other distributions may be assumed without going beyond the scope of the present invention as recited in the claims. Higher order statistics may also be used to describe these characteristics.

Based on the estimated statistical distribution 504x, we identify the outlier components of which all the characteristics are outside of the respective statistical ranges. The respective statistical range may be defined as 8.5 times the standard deviation relative to the mean for each particular characteristic. These connected components are candidates for non-text connected components. Text components usually contain a smaller number of pixels and have smaller size and area-to-pixel-count ratio when compared to non-text components.

As shown in FIG. 1C, the table lines are often very close to the embraced texts. Thus, the candidate components detected in the previous step often contain both the long lines and text pixels attached to the long lines. These attached text pixels should not be taken into account in the process of determining the exact location of the long lines in the image; otherwise, the estimated location of the long lines will be biased.

As shown in FIG. 1C, the white pixel density around a text pixel is generally higher than that around a line pixel. The present invention may employ a local density filter to get rid of text pixels from the detected components. The local density filter includes computing the density of the white pixels belonging to the same connected component 114 inside a local window centered at each pixel on the connected component 114. The size of the local window may be a 15×15 square of pixels. Other window sizes may be used without going beyond the scope of the invention as recited in the claims.

If the density in the local window is higher than a preset threshold, the pixel of interest is ignored during the long line detection process. If the number of ignored pixels exceeds a certain percentage of the number of pixels in the connected component 114, the entire connected component 114 is ignored during the long line detection process.

Once the connected component 114 has been filtered to remove the text pixels with the local density filter, a Hough Transform is used to detect the relatively long lines among the connected components 114 that have been filtered. For each of the detected relatively long lines, we compute the line segment inside a bounding box of the connected component 114 corresponding to the detected relatively long line. If the number of pixels associated with the line segment is larger than a percentage threshold of the length of the bounding box, then the representation of the pixels of the connected component 114, associated with the line segment are switched from white pixels to black pixels. The percentage threshold is not a fixed value but is within the range 50% to 90% and is adaptive to the length of the line segment. The longer the line segment, the smaller the percentage threshold. FIG. 1D shows an example where the table lines and image boundaries have been removed from the binary label image. Switching the line segments from white pixels to black pixels is equivalent to removing the line segments from the image. The connected component 114 associated with the line segment is also removed from the list of connected components 314.

Extracting the Text Pixels

The list of connected components 314 minus the line segments is used in identifying the text pixels. Pixels are identified on the boundaries and the bodies of the connected components 314, by performing a two class segmentation inside the bounding box of each connected component 114. The two classes are background pixels and text pixels. To separate the two classes, color statistics are computed based on the original image 102 as illustrated in FIG. 1A. Specifically, for each connected component 114, the color statistics are computed based on the pixels of the connected component. In addition, the color statistics of the pixels just outside the bounding box surrounding the connected component 114 are also computed. The former represents the statistical color distribution of the text pixels and the latter represents the statistical color distribution of the background pixels.

For each pixel within the bounding box, if the color of the pixel is within the statistical range of the background color distribution, it is labeled as a background pixel. Otherwise, the background label competes with the text label for this pixel in a maximum likelihood manner, i.e. the pixel is assigned the label with the highest likelihood. The competition is adapted relative to the area of the bounding box of the connected component 114. The bigger the area of the bounding box the more the competition favors the background label. The competition is based on the background color distribution and the color distribution of the connected component.

When a pixel is located in the bounding boxes of more than one component, the label assigned to the pixel is determined by the color statistics of the bounding box with the greatest area. This way helps avoid misidentification of text pixels when their corresponding component embraces another component of the background pixels. Because the table lines are often connected, the area of the bounding box associated with the table lines is generally greater than the area of bounding boxes associated with the text inside the table. Thus, if the table lines are not removed, the table lines are identified as text components and the text pixels embraced by the table lines are classified as background pixels. This is one reason why it is advantageous to remove lines before identifying the text pixels.

FIG. 1E is an illustration of a binary image 110 in which the text pixels have been labeled as white pixels and the background pixels have been labeled as black pixels. OCR is performed using the text pixels as input. Experimental results show that when the present invention is used as input for an OCR method, the OCR performance is greatly improved over prior art OCR methods that operate directly on the input image.

Method

Figure 6A:
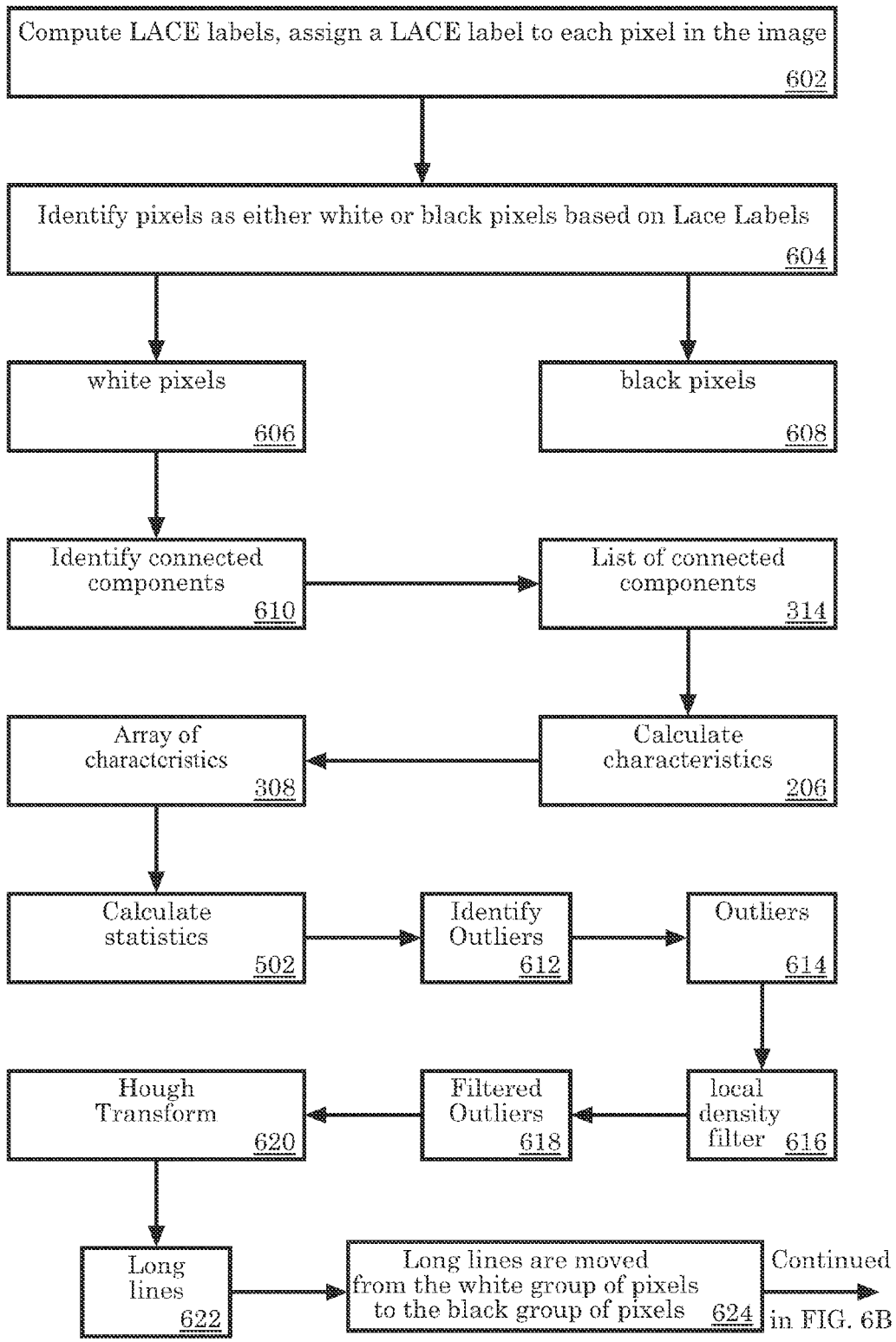
FIGS. 6A-C are flowcharts illustrating a method of performing the present invention.
Figure 6B:
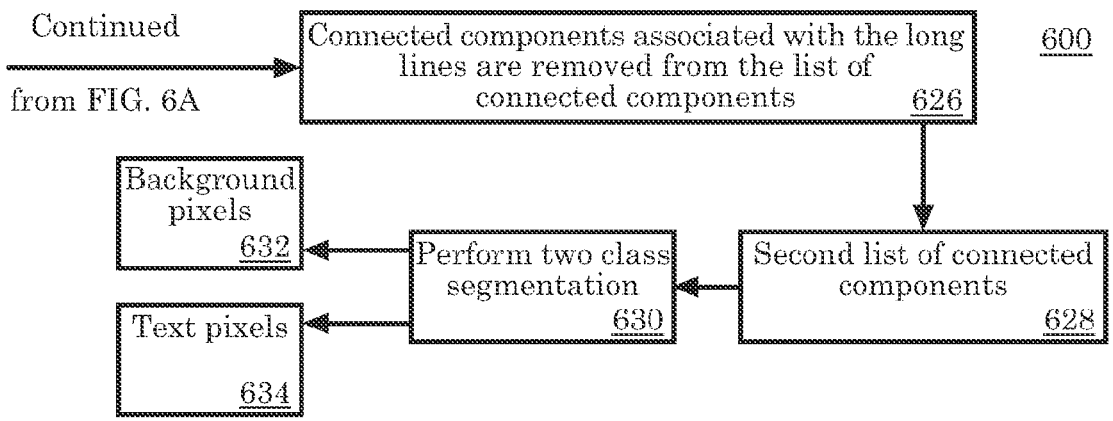

FIGS. 6A-6B illustrate a method 600 for implementing the present invention as described above and as recited in the claims. A first step 602 is to take an input image such as image 102 shown in FIG. 1A and compute the LACE labels associated with the document. The input image may be a scanned image, a computer generated image, a digital picture, or a frame of a digital video. Each pixel in the input image is assigned a LACE label.

Based on the LACE labels each pixel in the input image is assigned to one of two groups, a white pixel group 606 and a black pixel group 608, in a step 604. Pixels in the input image whose LACE label is a non-halftone or a halftone edge are assigned to the white pixel group 606. All other pixels are assigned to the black pixel group 608.

The next step 610 is to segregate pixels assigned to the white group 606 into a plurality of connected components 114. This is done in the manner described above. The plurality of connected components 114 is used to form the list of connected components 314.

In a step 206 characteristics of each connected component 114 is calculated to form an array of characteristics 308 that describe all of the connected components 314. The characteristics include: the number of pixels in each connected component (pixel count); the length of each connected component; the width of each connected component; and the ratio between the area of a bounding box encapsulating each connected component 114 and the pixel count. The bounding box of a particular connected component 114 may be defined as the smallest rectangular group of pixels that encapsulates the particular connected component 114. Alternatively, the bounding box may have an arbitrary shape that encapsulates the particular connected component 114. Alternatively, the characteristics may include the aspect ratio, edge information, color gradient, pixel density inside the bounding box, distance between connected components in a limited area of the document or some other characteristic of the connected component that statistically distinguishes a non-text connected component from a text connected component.

For each type of characteristic x there is a characteristic array $308x$, wherein each element of the characteristic array $308x$ is a characteristic x associated with one of the connected components. A step 502 is used to calculate statistics that describe the characteristic array $308x$. The statistics may be limited to the standard deviation and the mean. Alternatively, the statistics may include higher order statistical moments of the characteristic array $308x$ which effectively describe the distribution of characteristics associated with the text connected components found in the characteristics array $308x$ as opposed to the non-text connected components.

The next step 612 is to identify outliers 614. The outlier 614 is defined as a particular connected component in which none of the characteristics of the particular connected component are within a statistical range of characteristics. Alternatively, the outlier 614 may be defined as a particular connected component in which a subset of the characteristics of the particular connected component are not within the statistical range of characteristics. The statistical range for each characteristic may be defined as 8.5 times the standard deviation relative to the mean.

In a step 616, a local density filter is applied to each outlier 614, in the manner described above, to produce a group of filtered outliers 618. In a step 620, a Hough transform is applied to the filtered outliers 618, in the manner described above, to produce long lines 622. As described above, in a step 624, the long lines 622 are moved from the white group of pixels 606 to the black group of pixels 608.

In a step 626, the connected components 114 that are associated with the long lines 622 are removed from the list of connected components 314 to form a second list of connected components 622. New connected components are formed from pixels that were once part of the outliers 616 but were removed in steps 616 and 620 to form the long lines 622. The new connected components are added to the second list of connected components.

Two class segmentation 630 is than performed on each connected component in the second list of connected components 628 grouping them into background pixels 632 and text pixels 634. OCR is than performed on the text pixels 634 to identify characters and create text.

Figure 6C:
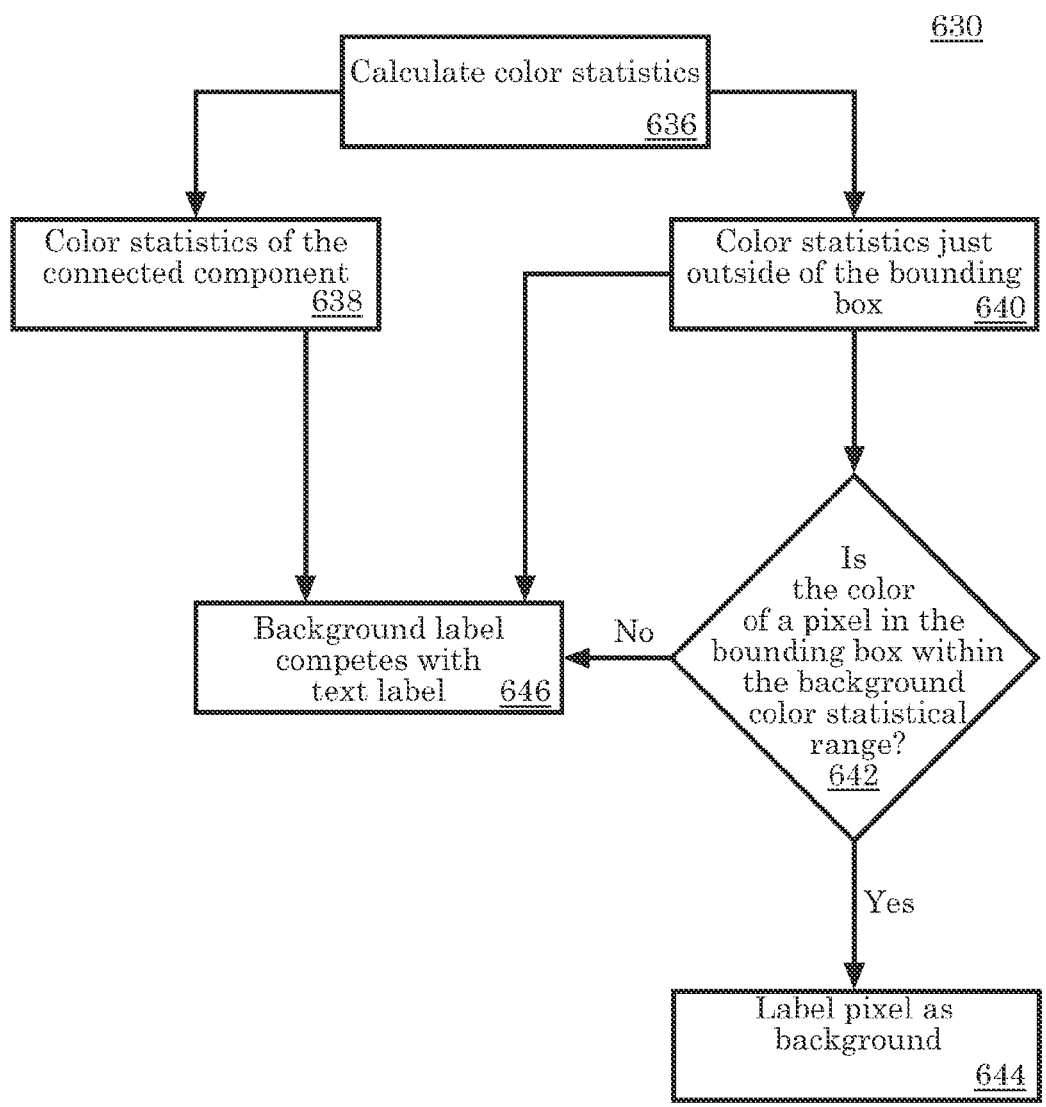

FIG. 6C is an illustration of a method for performing two class segmentation 630. Using the color data from the original image 102, color statistics are calculated in a step 636. Connected component color statistics 638 are calculated for each connected component 114 based on the color of each pixel associated with each connected component 114. Background color statistics 640 are calculated based on the color of each pixel just outside the bounding box of the connected component 114. The color statistics may include the mean and the standard deviation of all the components (RGB, CMYK) that describe the color of the pixel or may be limited to a subset of those components. In the context of a grayscale application, the color may refer to the intensity of the pixels. In the context of a monochrome application the two class segmentation include identifying the second list of components 628 as text pixels 634 and the rest of the pixels as background pixels 632. Higher order moments may also be used to describe the color statistics.

In a step 642 the color of each pixel in the bounding box is tested to determine if it is within the statistical range of the background color statistics 640. If the answer to step 642 is yes, then it is labeled as a background pixel 632 in a step 644. If the answer to step 642 is no, then the background color statistics 640 compete with the connected component statistics 638 in a step 646 in the adaptive manner described above. If the connected component statistics 638 win the competition 646 then the pixel is labeled as a text pixel 634. If the bounding box statistics 640 win the competition 646 then the pixel is labeled as a background pixel 632.

Experiments

The performance of the present invention is shown in the following two experiments on two example images 700 and 800. A first priority of the present invention is to extract text pixels in as precise a manner as possible. A second priority of the present invention is to eliminate as many non-text pixels as possible. There is a tradeoff between the first and second priorities. A consequence of this tradeoff is the presence of leftover non-text pixels in the final extraction results in order to avoid not identifying some text pixels. An OCR method may be used to identify these leftover non-text pixels, as non-text pixels.

Figure 7B:
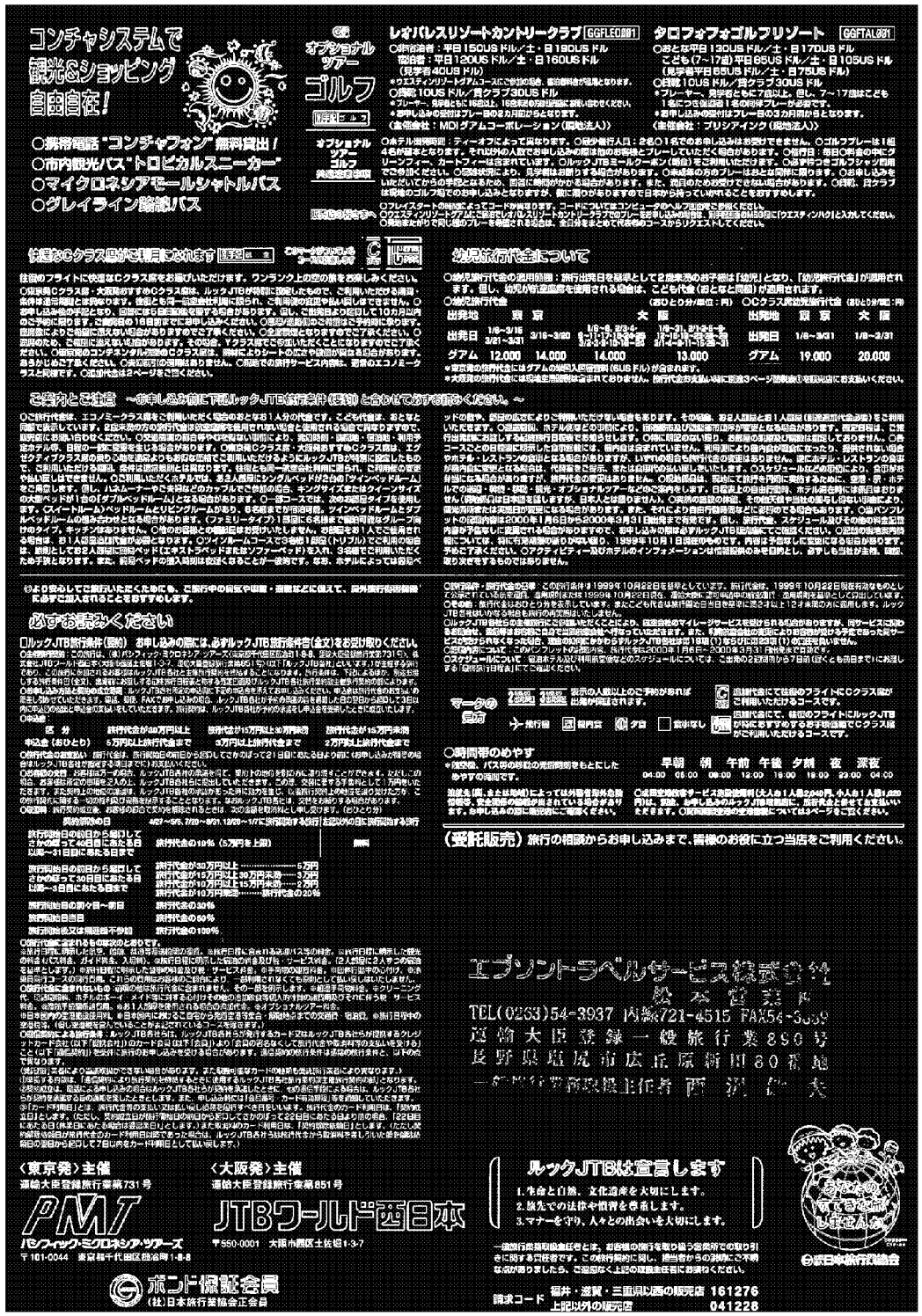

FIG. 7A is an illustration of an example image 700 upon which the present invention may be practiced. FIG. 7B is an illustration of an intermediary result 702 of the present invention in which lines have been removed from image 700. FIG. 7C is an illustration of an output 704 of the present invention which may be used as an input to an OCR system.

Figure 8A:
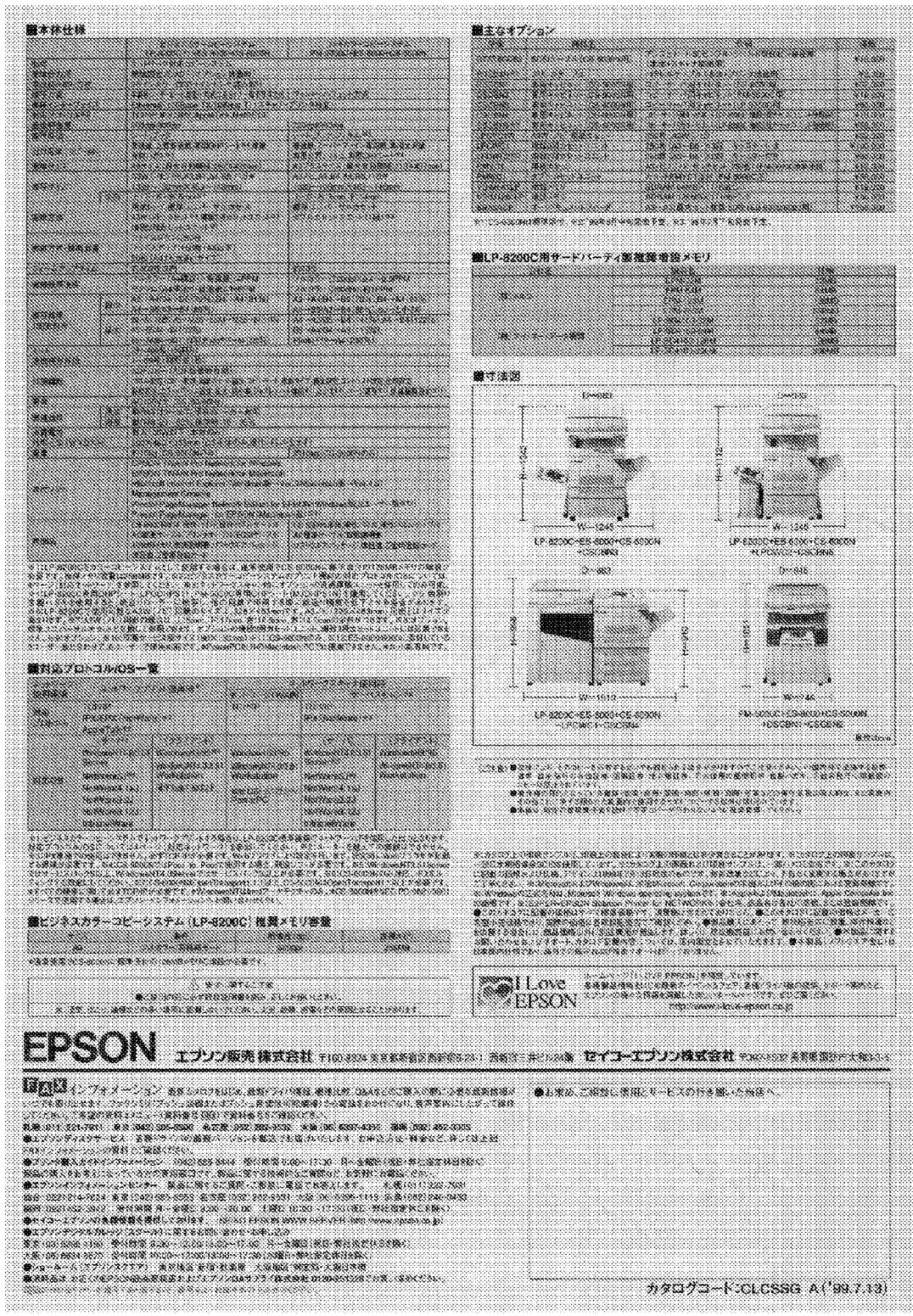
Figure 8B:
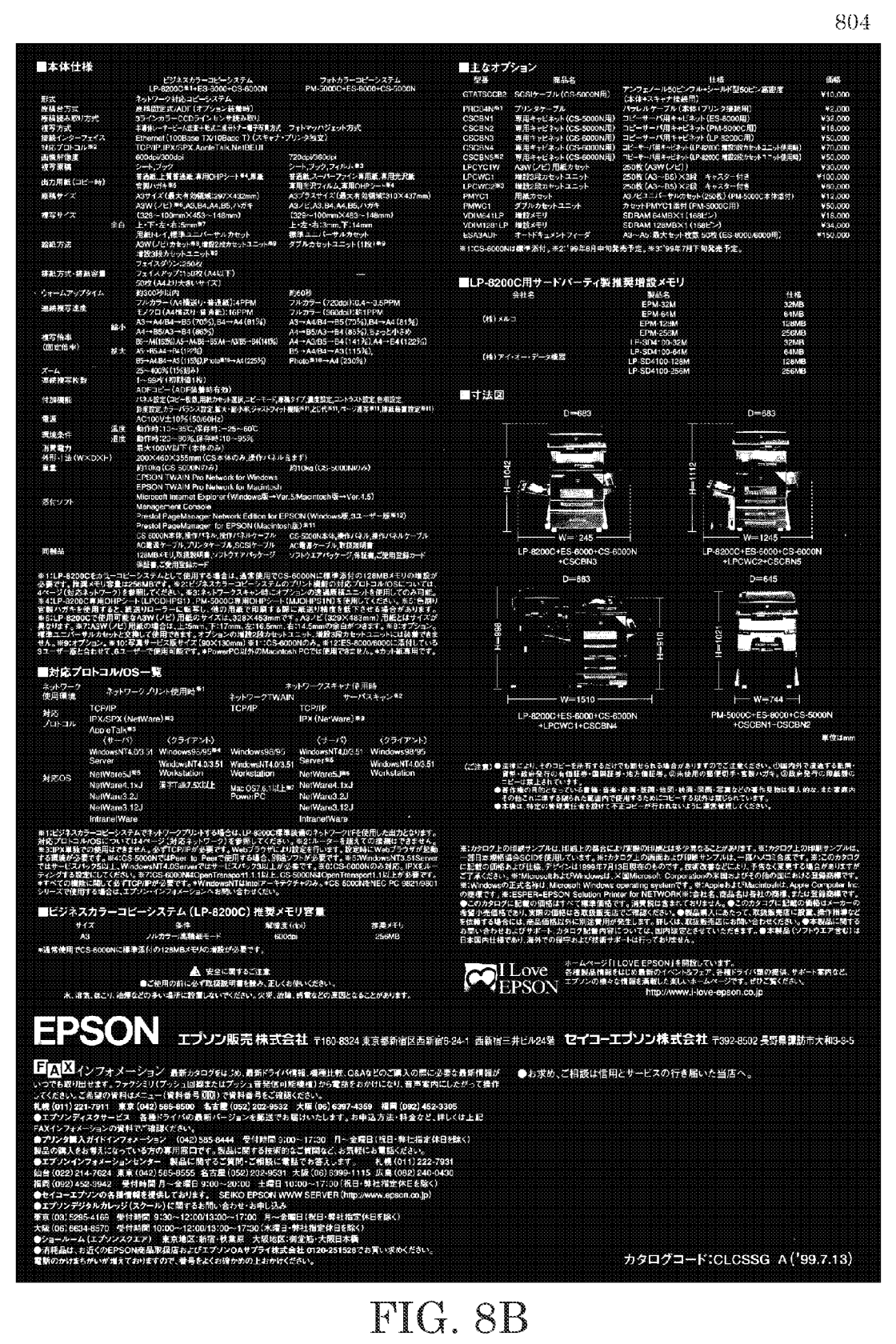

FIG. 8A is an illustration of a second example image 800 upon which the present invention may be practiced. FIG. 8B is an illustration of an output 804 of the present invention which may be used as an input to an OCR system.

System

Figure 9:
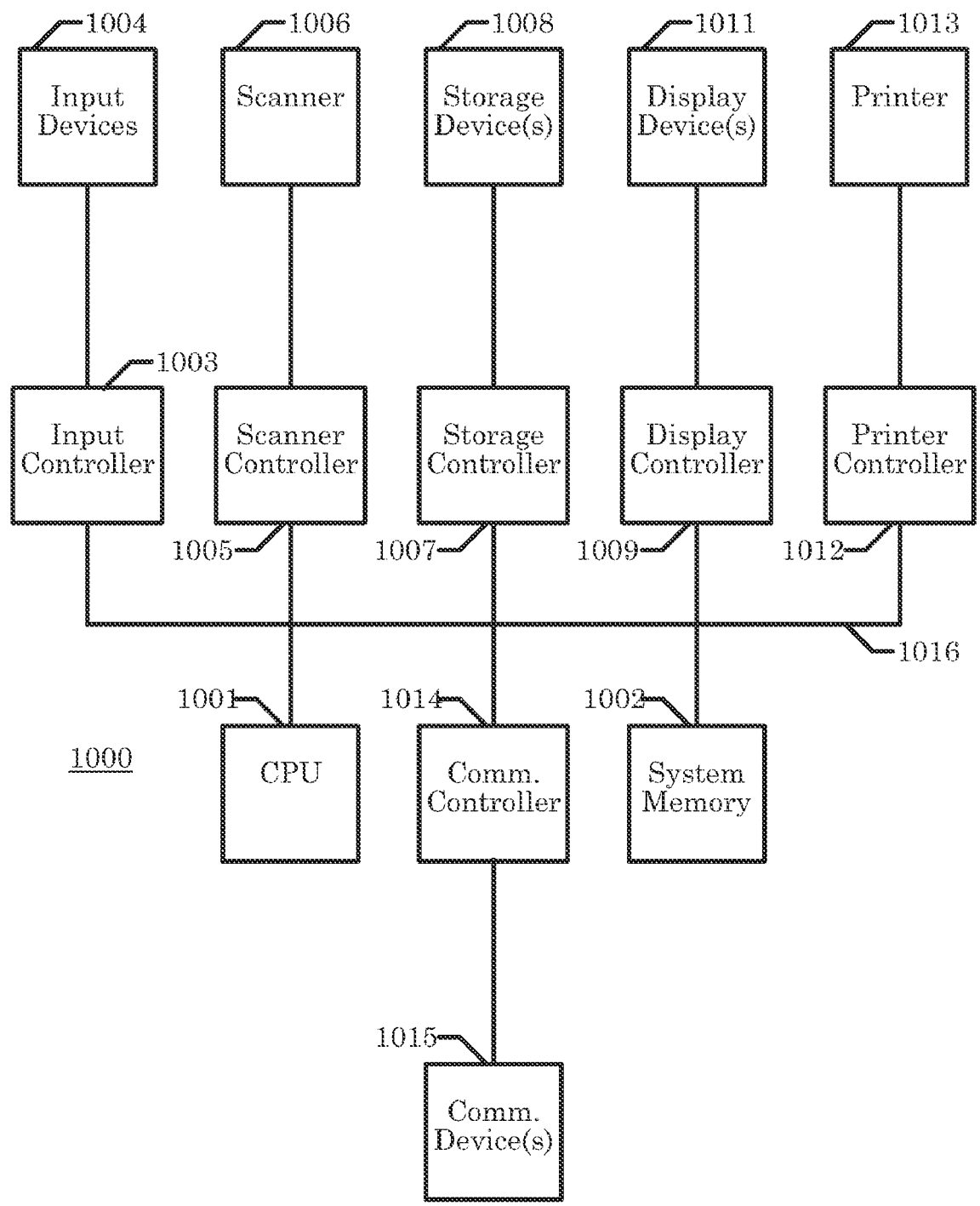
FIG. 9 illustrates a system on which the present invention may be implemented.

Having described the details of the invention, an exemplary system 1000, which may be used to implement one or more aspects of the present invention, will now be described with reference to FIG. 9. As illustrated in FIG. 9, the system includes a central processing unit (CPU) 1001 that provides computing resources and controls a general purpose computing device. The CPU 1001 may be implemented with a microprocessor or the like, and may also include a graphics processor and/or a floating point coprocessor for mathematical computations. The system 1000 may also include system memory 1002 which may be in the form of random-access memory (RAM) and read-only memory (ROM).

A number of controllers and peripheral devices may also be provided, as shown in FIG. 9. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape, magnetic disk, optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

The present invention may be implemented on an input device such as the scanner 1006, a copier, an all in one scanner copier printer, an all in one scanner copier printer fax machine, a camera, a camera phone or a video camera. The present invention may also be implemented on a general purpose computer connected to the input device. Alternatively, the present invention may be implemented using the resources of both the general purpose computer and the input device.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for identifying text pixels in a document, wherein the document consists of text pixels and non-text pixels, comprising steps of:
   (a) creating a group of connected components, wherein each connected component consists of a set of pixels in the document that together form a potential candidate for recognition as character using an optical character recognition method;
   (b) calculating a plurality of characteristics of different types for each connected component, forming a plurality of groups of characteristics, each group of characteristics including a characteristic of a single type for each of the connected components;
   (c) computing, using a computer, statistics of each group of characteristics;
   (d) identifying outlier components as connected components whose computed characteristics are all outside a statistical range of the computed statistics for each group of characteristics;
   (e) removing the outlier components from the group of connected components; and
   (f) identifying text pixels by segmenting pixels in the group of connected components into a group of text pixels and a group of background pixels.

2. A method for identifying text pixels in a document, wherein the document consists of text pixels and non-text pixels, comprising steps of:
   (a) identifying each pixel in the document as either:
      (i) a halftone pixel;
      (ii) a strong edge in a halftone region pixel;
      (iii) a strong edge in a non-halftone region pixel;
      (iv) a non-halftone pixel; or
      (v) a background pixel;
   (b) labeling each particular pixel in the document as either the member of a first group of pixels or a second group of pixels, based upon the identity of each pixel identified in step (a);
   (c) creating a connected component consisting of a candidate set of pixels from the first group of pixels by:
      (i) initializing the candidate set of pixels with a pixel from the first group of pixels;
      (ii) adding pixels to the candidate set of pixels which are adjacent to pixels in the candidate set of pixels and are in the first group of pixels;
      (iii) repeating the step (c)(ii) of adding pixels until all the pixels adjacent to the candidate set of pixels are in the second group of pixels; and
      (iv) calculating a plurality of types of characteristics of the connected component;
   (d) repeat step (c) so as to:
      (i) create additional connected components,
      (ii) form a group of connected components, and
      (iii) form a plurality of groups of characteristics, each group of characteristics including a characteristic of a single type for all the connected components;
   (e) computing, using a computer, statistics on each group of characteristics;
   (f) identifying outlier components as connected components whose characteristics are outside a statistical range of the computed statistics;
   (g) filtering the outlier components to segregate the pixels of the outlier components into additional connected components and a third group of pixels associated with long lines;
   (h) removing the third group of pixels from the first group of pixels, placing the third group of pixels in the second group of pixels, and removing the third group of pixels from the group of connected components; and
   (j) identifying text pixels by segmenting pixels in the group of connected components into a group of text pixels and a group of background pixels.

3. The method of claim 2 in step (b) wherein:
   the particular pixel is labeled as belonging to the first group of pixels if the identity of the particular pixel as determined in the step (a) is either (a)(iv) the non-halftone pixel or (a)(iii) the strong edge in a non-halftone region pixel; and
   the particular pixel is labeled as belonging to the second group of pixels if the identity of the particular pixel as determined in step (a) is either (a)(i) the halftone pixel, (a)(ii) the strong edge in a halftone region pixel, or (a)(v) a background pixel.

4. The method of claim 2, wherein the candidate sets are exclusive sets.

5. The method of claim 2, wherein the candidate sets are non-exclusive sets.

6. The method of claim 2, wherein the characteristics of the connected component comprises:
   a pixel count of the connected component;
   a length of the connected component;
   a width of the connected component; and
   a ratio between an area of a box bounding the connected component and the pixel count of the connected component.

7. The method of claim 2, wherein the statistics are calculated assuming a Gaussian distribution of each group of characteristics.

8. The method of claim 2, wherein the statistics comprise a standard deviation and a mean for each group of characteristics.

9. The method of claim 8, wherein the statistical range is 8.5 times the standard deviation from the mean.

10. The method of claim 2, wherein filtering the outlier components includes applying a local density filter and a Hough Transform to the pixels of the outlier components to identify pixels belonging to the third group of pixels associated with long lines.

11. The method of claim 2, wherein the step (f) includes identifying the outlier components as connected components whose characteristics are all outside the statistical range of the computed statistics.

12. The method of claim 2, wherein identifying the text pixels in a particular connected component includes:
   calculating a component statistical color distribution of the particular connected component;
   calculating a background statistical color distribution of the pixels just outside a bounding box surrounding the connected component;
   labeling each pixel within the bounding box as a background pixel if the color of said pixel is within the statistical range of the background color distribution;
   labeling each pixel within the bounding box as a text pixel if the color of said pixel is not within the statistical range of the background color distribution and the component color distribution wins a competition with the background color distribution; and
   labeling each pixel within the bounding box as a background pixel if the color of said pixel is not within the statistical range of the background color distribution and the background color distribution wins a competition with the component color distribution.

13. The method of claim 2, wherein the text pixels are used to identify characters in the document.

14. A computer readable medium that includes instructions for performing the method of claim 2.

15. A system that includes an optical recording device and includes instructions for performing the method recited in claim 2.

16. The system of claim 15, wherein the system is of a type selected from a group, consisting of: a scanner; an all in one printer scanner copier; an all in one printer scanner copier fax machine; a camera; a camera phone; and a video camera.

17. The system of claim 15, wherein the method is performed by the system, a general purpose computing device in communication with the system, or a combination of the general purpose computing device and the system.

18. A method for identifying text pixels in a document, wherein the document consists of text pixels and non-text pixels, comprising steps of:

creating a group of connected components, wherein each connected component consists of a set of pixels in the document that together form a potential candidate for recognition as character using an optical character recognition method;

calculating a plurality of characteristics of different types for each connected component, forming a plurality of groups of characteristics, each group of characteristics including a characteristic of a single type for each of the connected components;

computing, using a computer, statistics of each group of characteristics;

identifying outlier components as connected components whose computed characteristics are all outside a statistical range of the computed statistics for each group of characteristics;

removing the outlier components from the group of connected components; and identifying text pixels by segmenting pixels in the group of connected components into a group of text pixels and a group of background pixels, based on the color statistics of the connected component and the color statistics of pixels just outside a bounding box encapsulating the connected component.

* * * * *